United States Patent
Venkatramani et al.

(10) Patent No.: US 8,300,532 B1
(45) Date of Patent: Oct. 30, 2012

(54) FORWARDING PLANE CONFIGURATION FOR SEPARATION OF SERVICES AND FORWARDING IN AN INTEGRATED SERVICES ROUTER

(75) Inventors: Anjan Venkatramani, Los Altos, CA (US); Kannan Varadhan, San Jose, CA (US); Jean-Marc Frailong, Los Altos, CA (US); Sanjay Gupta, Santa Clara, CA (US); Linda Sun, San Jose, CA (US); Sankar Ramamoorthi, San Jose, CA (US); Pradeep Sindhu, Los Altos Hills, CA (US); Anand S. Athreya, San Jose, CA (US); Chih-Wei Chao, Saratoga, CA (US); Shuhua Ge, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 947 days.

(21) Appl. No.: 12/235,677

(22) Filed: Sep. 23, 2008

(51) Int. Cl.
*H04L 12/26* (2006.01)
*H04L 12/56* (2006.01)

(52) U.S. Cl. ........................ 370/235; 370/392

(58) Field of Classification Search .................. None
See application file for complete search history.

(56) References Cited

U.S. PATENT DOCUMENTS

| | | | |
|---|---|---|---|
| 7,953,885 B1 * | 5/2011 | Devireddy et al. | 709/238 |
| 2006/0153225 A1 * | 7/2006 | Kamiya | 370/463 |
| 2007/0058632 A1 * | 3/2007 | Back et al. | 370/392 |
| 2007/0201357 A1 * | 8/2007 | Smethurst et al. | 370/229 |
| 2007/0271362 A1 * | 11/2007 | Bamnolker | 709/223 |

* cited by examiner

*Primary Examiner* — Marcus R Smith
(74) *Attorney, Agent, or Firm* — Harrity & Harrity, LLP

(57) ABSTRACT

A method may include receiving a packet at an ingress line interface in a forwarding plane of a network element, the packet including header information. The method may also include conducting a flow table lookup in the forwarding plane to identify an existing flow for the packet and determining, in the forwarding plane and based on the header information, whether a predicted flow can be identified for the packet if an existing flow can not be identified. The method may further include performing a service access control list (ACL) lookup in the forwarding plane if a predicted flow can not be identified; and forwarding the packet to one of a services plane or an egress line interface in the forwarding plane based on one of the existing flow, the predicted flow, or the service ACL lookup.

20 Claims, 10 Drawing Sheets

Forwarding Plane

FORWARDING PLANE CONFIGURATION FOR SEPARATION OF SERVICES AND FORWARDING IN AN INTEGRATED SERVICES ROUTER

BACKGROUND

Networks typically include elements, such as routers, switches or gateways, which transfer or switch data from one or more sources to one or more destinations. A packet is one format of data in which encapsulated data can be transmitted through a network. A network element, such as a router or a switch, may include service engines that process packets. When the network element receives a packet at an ingress interface, the network element may send the packet to one of its service engines to render specialized services for the packet (e.g., hypertext transfer protocol (HTTP) caching service, intrusion detection system (IDS) service, load balancing service, firewall service, etc.). Upon rendering the services, the network element may drop the packet or send the original or modified packet to another network element through an egress interface.

Some network elements may divide processing functions among a control plane, a forwarding plane, and a services plane, which allows for faster processing. Generally, the control plane may define what to do with incoming packets. The forwarding plane may implement routing instructions from the control plane to forward packets downstream as quickly as possible. The services plane may apply specialized network-based functions to the packets prior to the packets being forwarded. Thus, services plane traffic may be processed differently than traffic in the forwarding plane.

SUMMARY

In one implementation, a method may include receiving a packet at an ingress line interface in a forwarding plane of a network element, the packet including header information. The method may also include conducting a flow table lookup in the forwarding plane to identify an existing flow for the packet and determining, in the forwarding plane and based on the header information, whether a predicted flow can be identified for the packet if an existing flow can not be identified. The method may further include performing a service access control list (ACL) lookup in the forwarding plane if a predicted flow can not be identified; and forwarding the packet to one of a services plane or an egress line interface in the forwarding plane based on the existing flow, the predicted flow, or the service ACL lookup.

In another implementation, a network device may include a line interface, the line interface being in a forwarding plane. The line interface may include a forwarding module, predicted flow logic, a service ACL and processing logic. The predicted flow logic may receive a packet at the line interface, identify if a predicted flow of the packet can be determined using the predicted flow logic, conduct an ACL lookup using the service ACL, and forward the packet using the forwarding module to a services plane based on the identification of the predicted flow or ACL lookup.

In a further implementation, a network element may include means for receiving a packet at an ingress line interface in the forwarding plane; means for identifying, within the forwarding plane, whether an existing flow is present for the packet; means for determining whether a predicted flow can be determined for the packet within the forwarding plane, if the means for identifying whether an existing flow is present does not identify an existing flow; means for conducting an ACL lookup for the packet in the forwarding plane if the means for determining whether a predicted flow can be determined does not identify a predicted flow; and means for forwarding the packet to a services plane based on the means for identifying, means for determining, or means for conducting.

In still another implementation, a method may be performed by a network device having a forwarding plane and a services plane. The method may include receiving a packet at an egress line interface in the forwarding plane of a network element and determining whether services have been performed on the packet in the services plane. If services were not performed on the packet in the services plane, then, the method may further include, in the forwarding plane, conducting a flow table lookup to identify an existing flow for the packet, conducting a predicted flow match of the packet to identify a predicted flow, and conducting an egress services policy lookup. The method may also include forwarding the packet to a service engine distributor based on the flow table lookup, predicted flow match, or egress policy lookup.

In an additional implementation, a network device may include a forwarding plane to conduct flow table matching, predicted flow matching, and/or access control list (ACL) lookups for a packet; and a service plane to conduct stateful services for the packet, where the services plane may be architecturally separate from the forwarding plane and the packet may traverse the forwarding plane and the services plane to provide processing and routing of the packet.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Integration of stateful services (e.g., flow-base services) in a stateless forwarding device, such as a router, may effectively be achieved with a clean partition of functionality, without repetitive and/or redundant calculations. Systems and methods described herein may provide architectural separation of forwarding and services in an integrated services router. In one implementation, flow table matching, predicted flow matching, and/or access control list (ACL) lookups for a packet may be conducted by a line interface in the forwarding plane. Stateful services may be restricted to service processing engines in the services plane. A packet may traverse the forwarding and services planes repeatedly to provide necessary processing and routing of the packet.

The term "packet," as used herein, may refer to a packet, datagram, cell; a fragment of a packet, datagram or cell; or other types of data. For example, a packet may refer to an Internet Protocol (IP) packet that has been pre-pended with additional header fields (e.g., packet classification information, addresses, etc.). The term "flow," as used herein, may refer to a stream of packets from a particular source to a particular destination. In a flow-based routing architecture, information, which is searched, retrieved or calculated during the processing of an initial packet of a flow, may be cached for reuse during processing of subsequent packets of the same flow. As used herein, the term "stateful" may refer to a packet received from a source that references stored content, such as state information for a packet flow. In contrast, "stateless" may refer to a packet received from a source that contains all necessary information for the provider to process it without relying on stored content.

As used herein, the term "forwarding plane" may refer to the part of a network element architecture that identifies routing paths and provides forwarding services for individual packets or other data units arriving on an ingress/egress interface. As used herein, the term "services plane" refers to the part of a network element architecture that provides processing of individual packets, including security processes such as address translation, encryption, compression, and the like.

Exemplary Network Overview

Figure 1:
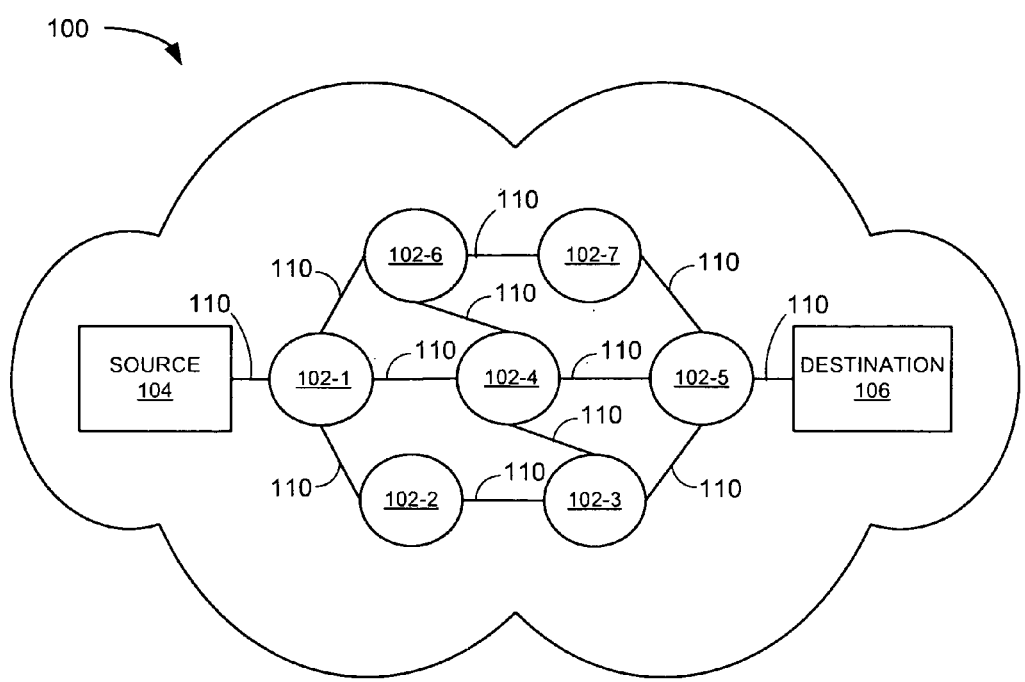
FIG. 1 is a diagram of an exemplary network in which concepts described herein may be implemented.

FIG. 1 illustrates a network 100 according to an exemplary embodiment. Network 100 may include the Internet, an ad hoc network, a local area network (LAN), a wide area network (WAN), a metropolitan area network (MAN), a cellular network, a public switched telephone network (PSTN), any other network, or a combination of one or more networks.

As shown, network 100 may include any number of network devices for routing packets through network 100, with multiple network devices 102-1 through 102-7 (herein collectively referred to as "network devices 102" and generically and individually referred to as a "network device 102-x") shown in FIG. 1 by way of example. Each network device 102-x may include, for example, a router, a switch, or a gateway, that routes or switches incoming packets towards one or more destinations.

As further shown in FIG. 1, network 100 may include a source node 104 and a destination node 106 interconnected via network devices 102. Source node 104 and destination node 106 may each include, for example, a host or a server. Source node 104 and destination node 106 may connect with devices in network 100 via wired and/or wireless connection links 110 (generically referred to herein as "network links 110"). Packets that originate at source node 104 may be routed to destination node 106 via network devices 102.

The number and configuration of network devices 102 depicted in FIG. 1 are for illustrative purposes only. A network may include different, more or fewer network devices than are illustrated in FIG. 1. Additionally, only a single source node 104 and destination node 106 have been shown in FIG. 1 for purposes of simplicity. However, multiple source nodes and destination nodes may be coupled to network devices 102.

Exemplary Network Device Configuration

Figure 2A:
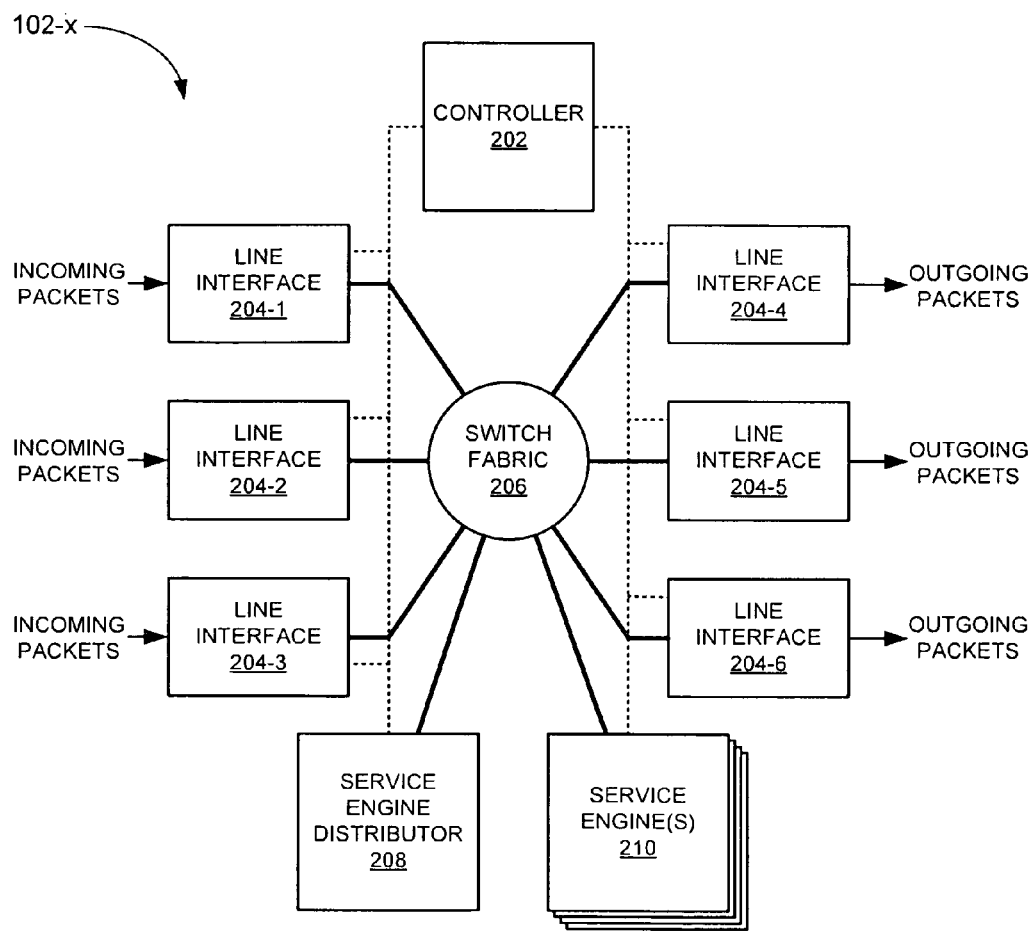
FIG. 2A is a diagram of a network device of FIG. 1 according to an exemplary implementation.

FIG. 2A illustrates a network device 102-x according to an exemplary implementation. Network device 102-x may receive one or more packets from one or more physical links, process the packets to determine their destinations, and transmit the packets on one or more links in accordance with the determined destinations or one or more other properties of the packets.

As shown in FIG. 2A, network device 102-x may include a controller 202, line interfaces 204-1 through 204-6 (herein collectively referred to as "line interfaces 204" and generically and individually referred to as a "line interface 204-x"), and a switch fabric 206.

Controller 202 may include components for managing routes, flow statistics, and/or types of information that may require centralized processing. Controller 202 may manage routes (e.g., accept or disseminate routes to other network devices 102) in accordance with routing/signaling protocols. In addition, controller 202 may receive and process flow statistics and/or packet samples from other components of network device 102-x (e.g., line interfaces 204). In certain implementations, controller 202 may supply information to line interfaces 204, service engine distributor 208, and/or service engines 210 for forwarding and processing packets. For example, controller 202 may create spanning tree instances and/or routing tables based on network topology information, create forwarding tables based on the routing tables, and forward the forwarding tables to line interfaces 204. Line interfaces 204 may use the forwarding tables to perform route lookups for incoming packets. Controller 202 may also perform other general control and monitoring functions for network device 102-x.

Line interfaces 204 may include components for receiving packets from other network devices in network 100 and/or for transmitting the packets to other network devices in network 100. In addition, each of line interfaces 204 may perform, for example, packet forwarding, packet classification, internal redirection of packets to other components in network device 102-x, management of a flow table, and sampling flows. Line interfaces 204 may each connect to controller 202, switch fabric 206, service engine distributor 208, and service engine(s) 210. Connections between line interfaces 204, control device 202, service engine distributor 208, and service engine(s) 210 are indicated by dashed lines. Line interfaces 204 may receive packet data on physical ports (not shown) connected to a network link, such as one of network links (FIG. 1). Each physical port may include one of many types of transport media, such as an optical fiber or Ethernet cable. Data on the physical port may be formatted according to one of several protocols, such as the synchronous optical network (SONET) standard, an asynchronous transfer mode (ATM) technology, Ethernet, or Internet Protocol. The data may take the form of packets, which may include entire packets or a portion of a packet. In one implementation, a line interface 204-x may include, for example, a packet forwarding engine (PFE) to provide packet switching, route lookups, packet forwarding, and route lookup functions.

A line interface 204-x may process incoming packets prior to transmitting the packets to another line interface 204-x, service engine distributor 208, service engine(s) 210 or a network link 110. To facilitate this processing, line interface 204-x may reassemble the packets from portions of the packet and perform a route lookup for the packet using a forwarding table to determine destination information. If the destination information indicates that the packet should be sent out on a physical port connected to line interface 204-x, then line interface 204-x may prepare the packet for transmission. If the destination information indicates that the packet should be sent out on a physical port not connected to line interface 204-x, then line interface 204-x may transfer the packets to another line interface 204-*x* through switch fabric 206. Other aspects of line interfaces 204 are described in more detail with respect to FIG. 3.

Switch fabric 206 may include switches for conveying packets from line interfaces 204, service engine distributor 208, service engine(s) 210 or other components of network device 102-*x* (not shown) to line interfaces 204, service engine distributor 208, service engine(s) 210 or other components.

Service engine distributor 208 may include components for coordinating the distributed architecture of network device 102-*x*. In one implementation service engine distributor 208 may include logic to identify appropriate service engine(s) 210 in the service plane for packets that require services from network device 102-*x*. For example, one of line interfaces 204-*x* may identify, in the forwarding plane, that a packet needs a service, but may not identify what kind of service or what service engine may perform the service. Line interface 204-*x* may forward the packet to service engine distributor 208 for determination of the correct service engine. Service engine distributor 208 may also include logic to load balance the processing of packets by service engine(s) 210.

Service engine(s) 210 may include one or more service modules to perform services for a packet. A "service module" may refer to, within a network element, a logical or physical unit for performing a set of tasks or a service for a packet that arrives at the network element. For example, service engine(s) 210 may include a firewall service module, an intrusion detection service module, a compression module, an encryption/decryption service module, an address translation module, a hypertext transfer protocol (HTTP) service module, or other types of service modules. Service engine(s) 210 may perform services on packets and then forward the packets to another service engine or to a line interface 204-*x* for processing. For example, each of service engine(s) 210 may render a specific service and redirect the packet to its next destination service engine, based on a redirection table and/or processing information provided in, for example, header information in the packet. After a last service at one of the service engines, the packet may be either dropped or sent to an egress one of line interfaces 204 for transmission from network element 102-*x* via link 110.

While FIG. 2A shows a particular number and arrangement of components, network device 102-*x* may include fewer, additional and/or different components than are shown in FIG. 2A. For example, network device 102-*x* may include additional or fewer line interfaces or additional service engine distributors, service engines, and/or controllers. In another example, service engine(s) 210 may be eliminated and network device 102-*x* may include one or more service modules (not shown) that are connected to switch fabric 206 to perform various network services.

Figure 2B:
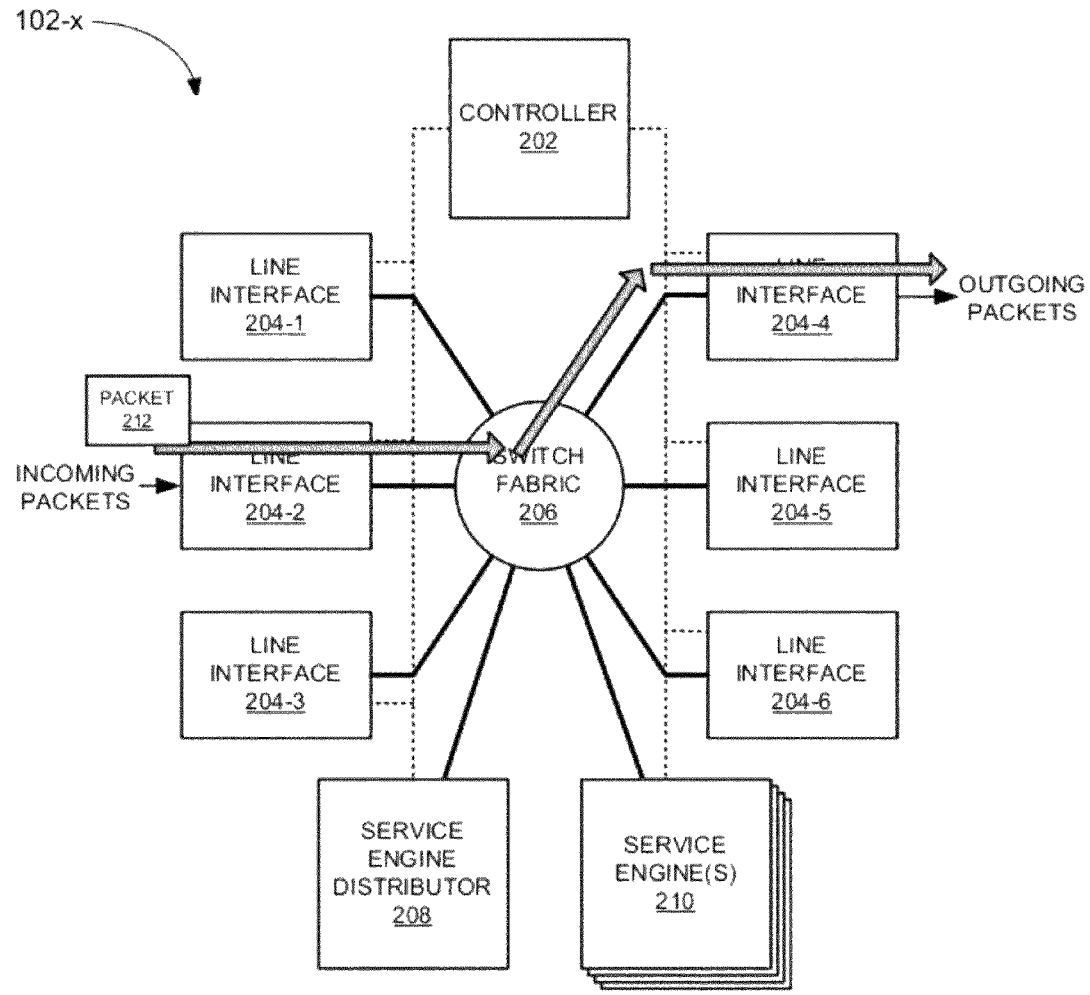
FIGS. 2B, 2C, 2D and 2E are diagrams of exemplary paths packets may take when traversing the exemplary network device of FIG. 2A.
Figure 2C:
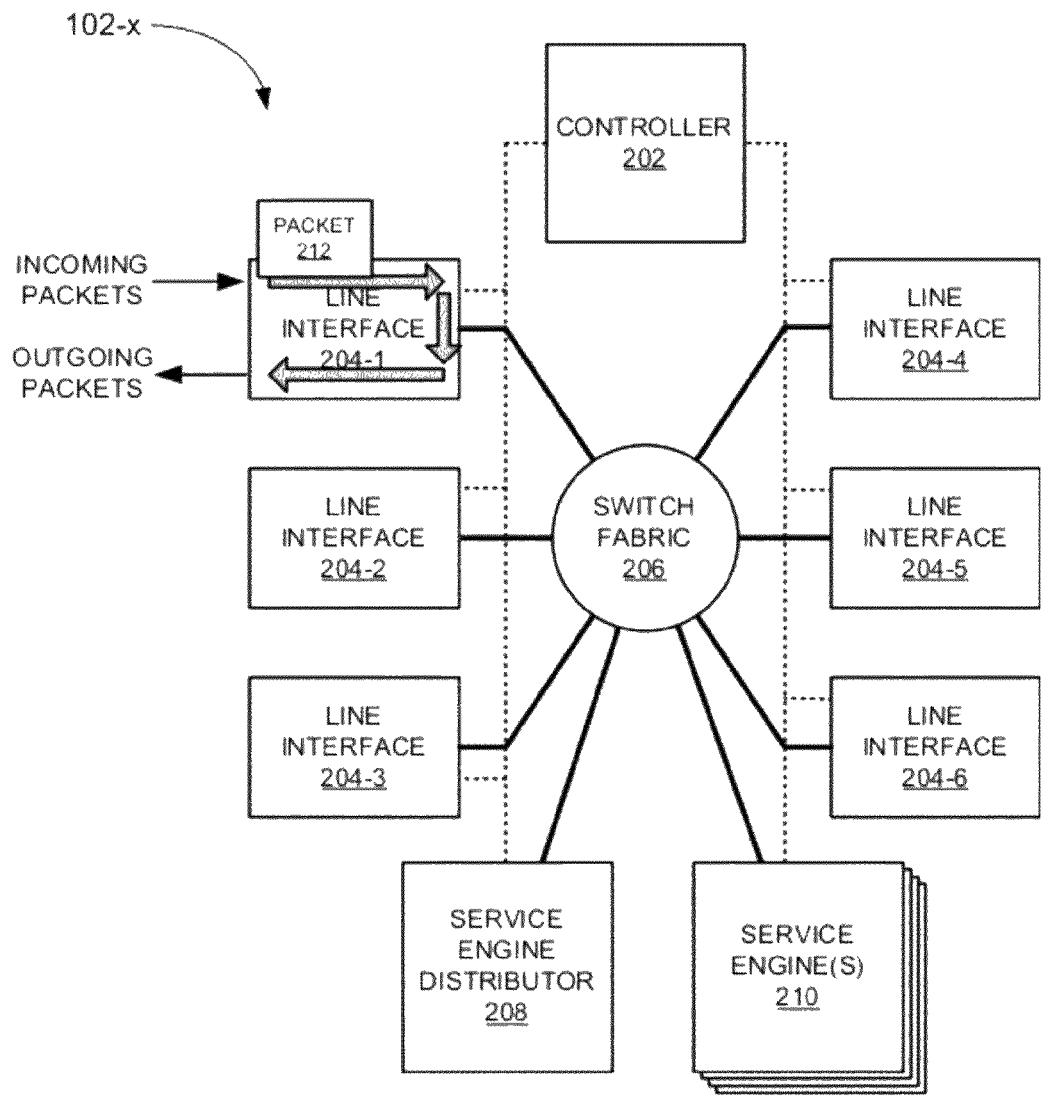

In FIG. 2A, each of line interfaces 204 may act as an ingress line interface and/or an egress line interface. Thus, each one of line interfaces 204 may receive packets from an external to network device 102-*x*, or forward packets towards destinations external to network device 102-*x*. FIGS. 2B, 2C, 2D and 2E illustrate examples of line interfaces 204 forwarding a packet and acting as ingress or egress line interfaces. In the example of FIG. 2B, a packet 212 may be received at line interface 204-2 from network 100, forwarded to line interface 204-4 via switch fabric 206, and sent toward its destination in network 100 from line interface 204-4. Thus, packet 212 may pass through network element 102-*x* in only the forwarding plane. Similarly, in the example of FIG. 2C, packet 212 may be received at line interface 204-1 from network 100 and be sent towards its destination in network 100 by line interface 204-1. Again, packet 212 may pass through network element 102-*x* in only the forwarding plane.

Figure 2D:
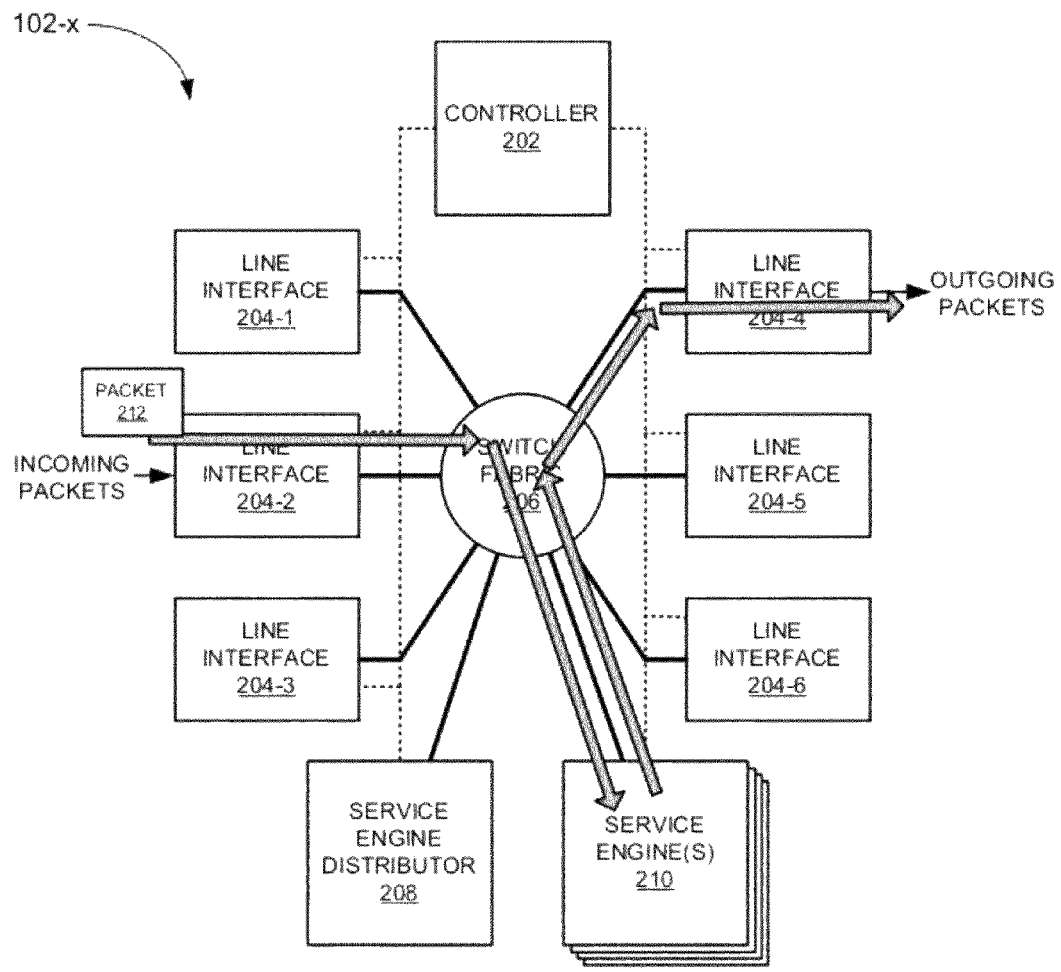
Figure 2E:
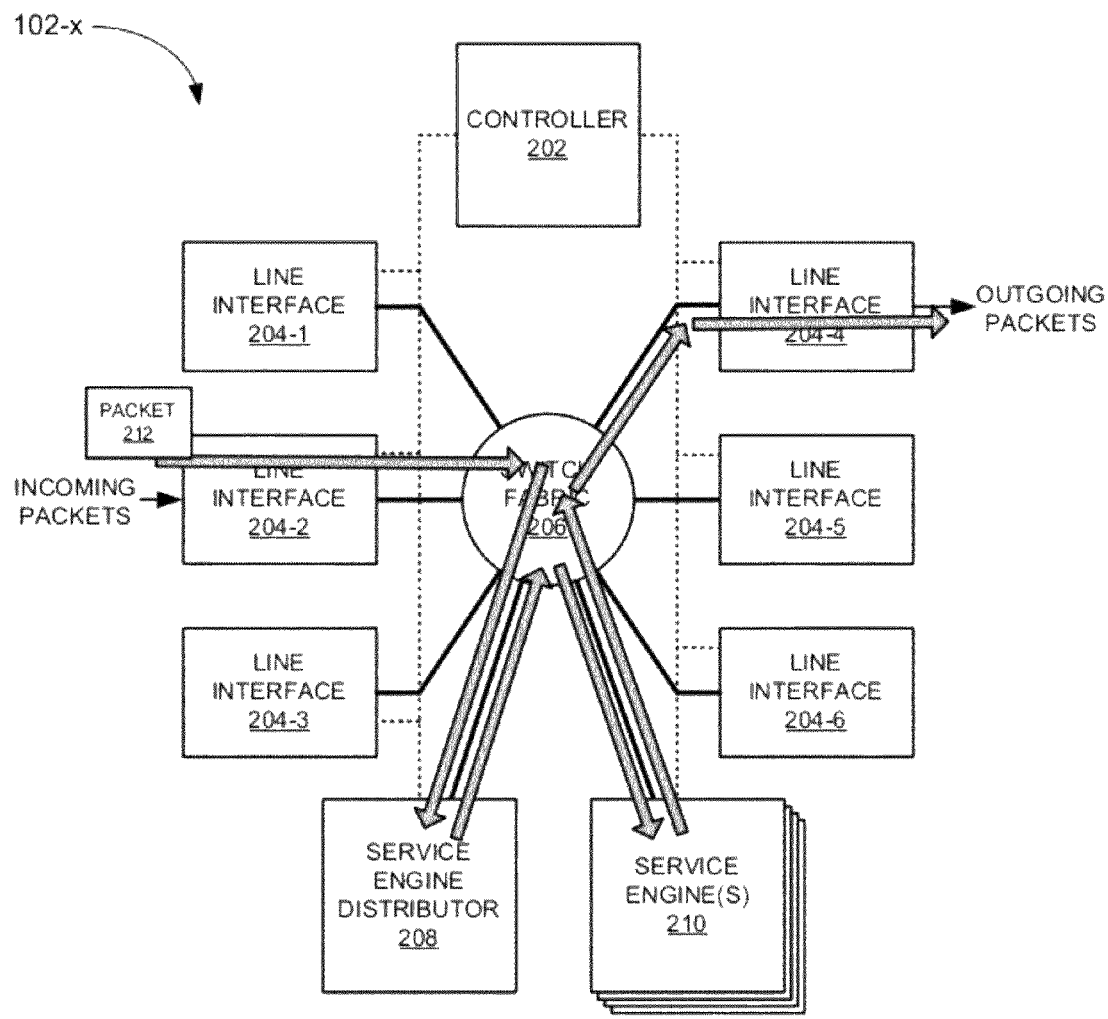

In the example of FIG. 2D, a packet 212 may be received at a line interface 204-2 from network 100 and pass through service engine(s) 210 (via switch fabric 206) before being sent via switch fabric 206 towards its destination in network 100 by line interface 204-4. This flow may exemplify a packet transitioning from the forwarding plane to the services plane and then back to the forwarding plane. In the example of FIG. 2E, a packet 212 may be received at a line interface 204-2 from network 100 and pass through service engine distributor 208 and service engine(s) 210 (via switch fabric 206) before being sent via switch fabric 206 towards its destination in network 100 by line interface 204-4. This flow may also exemplify a packet transitioning from the forwarding plane to the services plane and then back to the forwarding plane.

Exemplary Line Interface

Figure 3:
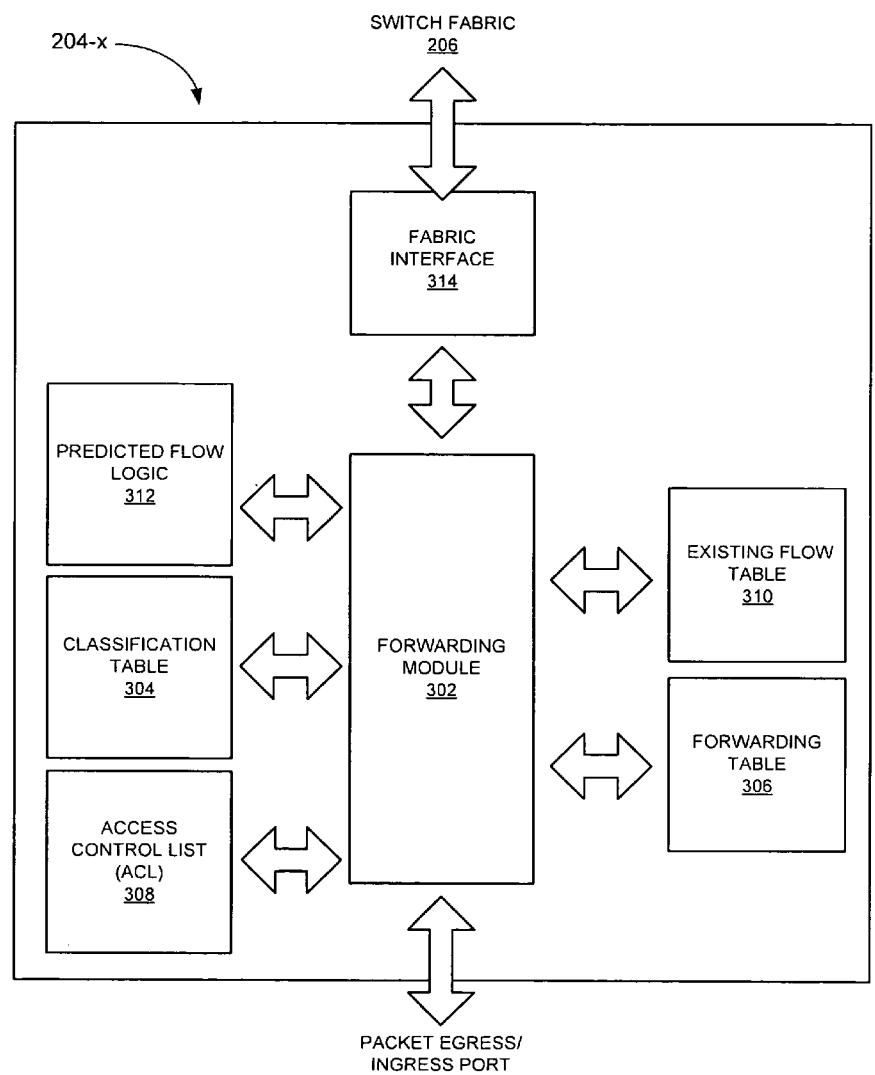
FIG. 3 is a functional block diagram of an exemplary line interface of FIGS. 2A through 2E.

FIG. 3 is a functional block diagram of an exemplary line interface 204-*x*. As shown, line interface 204-*x* may include a forwarding module 302, a classification table 304, a forwarding table 306, an access control list (ACL) 308, an existing flow table 310, predicted flow logic 312, and a fabric interface 314. Depending on the implementation, line interface 204-*x* may include fewer, additional, or different elements than those illustrated in FIG. 3.

Forwarding module 302 may include hardware and/or software for forwarding and/or classifying a packet that is received at line interface 204-*x*. Forwarding module 302 may include processing logic to perform a lookup in classification table 304, forwarding table 306, ACL 308, existing flow table 310 and/or predicted flow logic 312. In some cases, forwarding module 302 may obtain a packet descriptor that includes a forwarding address (e.g., a destination switch fabric port, a destination network port, etc.). In addition, forwarding module 302 may augment the packet by pre-pending the packet descriptor to the packet, and forward the original packet or the augmented packet to one of line interfaces 204, service engine distributor 208, or service engine(s) 210.

Classification table 304 may include rules for categorizing a packet based on a packet header. Examples of classification rules may include rules for performing an ACL lookup (e.g., if a particular field in a packet header includes a specified value, perform a lookup in ACL 308), for performing a policy-based routing (e.g., if a packet header is a telephony packet, route the packet from X to Y via an asynchronous transfer mode (ATM) circuit), and/or for rendering differentiated quality of service (QoS). In addition, classification table 304 may include parameters that are related to identifying a flow associated with a packet.

Forwarding table 306 may include route information applicable to a packet. For example, forwarding table 306 may include information for identifying an egress line interface to which to forward an incoming packet so that the packet can be transmitted to another network element based on the packet's network destination address. ACL 308 may include a list of rules that detail services or service ports that are available on network device 102-*x*. ACL 308 may include an infrastructure ACL (iACL), an object ACL (oACL), and/or other rules.

Existing flow table 310 may contain information identifying existing packet flows. For example, a hashing function may be applied to selected fields in the header of each incoming packet, and the hash value may be used to identify a flow. Comparing hash values within a moving time window may allow packets to be associated with an existing flow or identified as a new flow. Existing flow table 310 may be updated, for example, by signals from the service plane, particularly either by the service engine distributor 208 or the service engine 210. In another implementation, existing flow table may be updated with information from controller 202.

Predicted flow logic 312 may contain one or more packet parameters used to predict a future packet flow value. For example, certain originating information or destination information, packet density values or packet arrival rates may be indicative of a particular group of stateful services. Predicted flow logic 312 may be updated with information from controller 202.

Fabric interface 314 may include hardware and/or software for providing an interface to switch fabric 206, for sampling packets, and for managing the sampled packets and/or flow statistics. Fabric interface 314 may include one or more interfacing buffers (not shown) for temporarily storing augmented packets (e.g., packets pre-pended with additional header information) from forwarding module 302. The buffers may prevent the packets from being dropped if a bottleneck (e.g., a processing delay) develops on a line interface-to-line interface path during packet transport.

Exemplary Processes for Packet Forwarding

Figure 4:
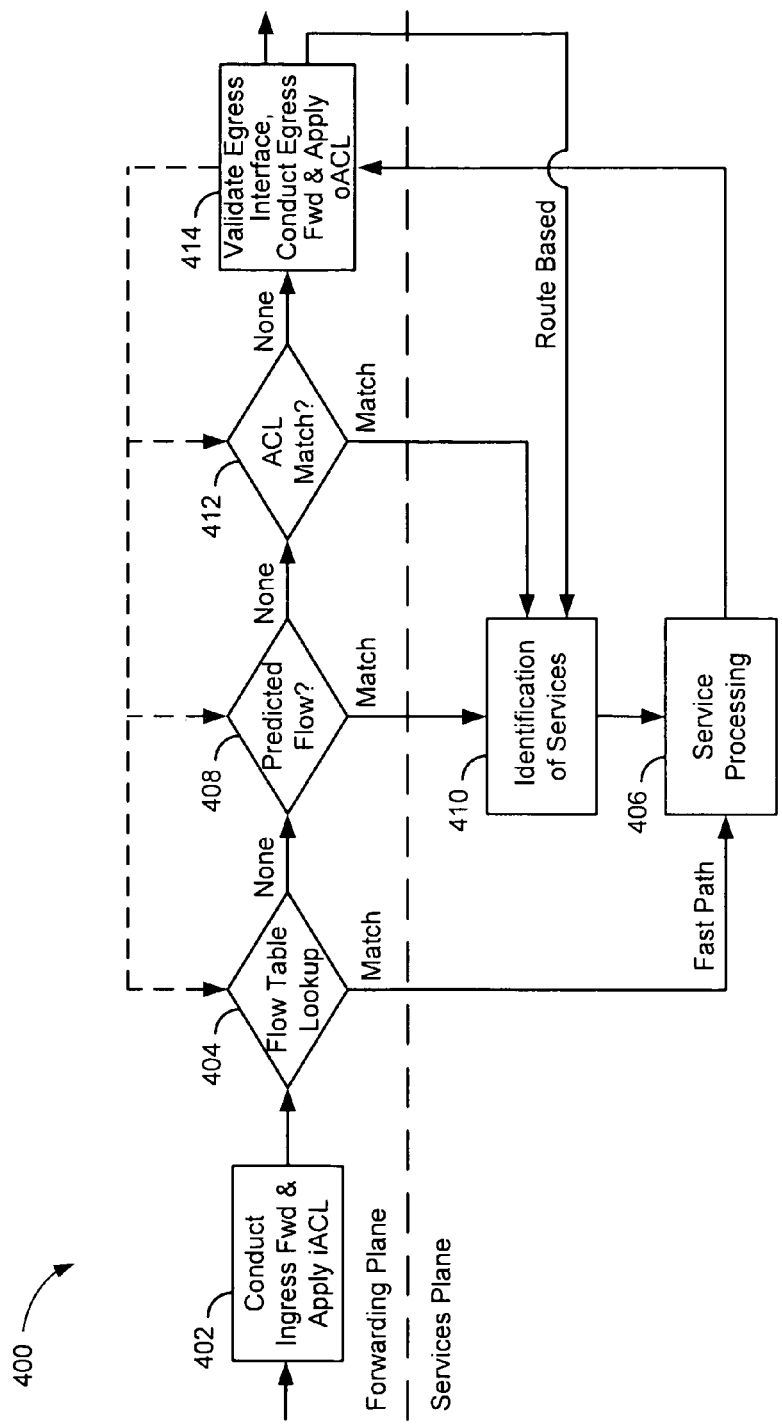
FIG. 4 is a flow diagram of an exemplary packet forwarding process that is capable of being performed by the network device of FIGS. 2A through 2E.

The above paragraphs describe system elements that are related to devices and/or components for separation of services and forwarding in a network device, such as an integrated services router. FIG. 4 illustrates a flow diagram of an exemplary process 400 that is capable of being performed by one or more of these devices and/or components. The process may begin when a packet is received in the forwarding plane of a network element (such as network element 102-*x* of FIGS. 2A-2E) from another source.

Ingress forwarding protocols and ingress access control lists (iACLs) may be applied against the packet (block 402). For example, line interface 204-*x* (FIG. 3) may compare the incoming packet against an iACL, such as a portion of ACL 308, that includes various fields. The iACL may, for example, indicate that external sources should be denied access to infrastructure addresses (e.g., routers and other network devices) within a network. The forwarding plane of network element 102-*x* may then evaluate whether services are needed for the received packet. In one implementation, ingress forwarding protocols may also include demultiplexing and/or packet separation.

A flow table lookup may be conducted (block 404). For example, line interface 204-*x* may evaluate information in the packet (e.g., a state lookup) to determine if the packet is associated with a particular flow. For example, line interface 204-*x* may compare the packet to information in existing flow table 310 (FIG. 3) to identify if a flow already exists for the packet. If a particular flow is identified, line interface 204-*x* may include with the packet a state variable or other metadata indicating the flow and the service engine 208 in the services plane that should receive packets with the identified flow. The packet (with the flow indication) may be sent to the services plane to receive appropriate service processing for the identified flow (block 406). For example, line interface 204-*x* may forward the packet on a fast path to the appropriate service engine 208 (e.g., bypassing service engine distributor 208) for processing based on the identified flow.

If a particular flow is not identified, a predicted flow match may be conducted (block 408). For example, line interface 204-*x* may check to see if a predicted flow for the packet is discernable. For example, predicted flow logic 312 in line interface 204-*x* (FIG. 3) may be used to determine whether an incoming packet is from a particular source and, if so, whether the packet is of a particular data type (e.g. a video stream) with a known flow or set of known of flows. For example, the origination source of a voice stream packet may be indicative of a predicted flow. If the packet contains information indicative of a predicted flow, then the packet may be forwarded to the services plane for identification of services (block 410). For example, line interface 204-*x* may forward the packet to service engine distributor 208 in the services plane for lookup of the appropriate service engine 210 and/or the appropriate service module within service engine 210. Line interface 204-*x* may include metadata, such as a state variable, with the data packet indicating that a predicted flow was identified. The state variable may indicate that further lookups for the packet may be required in the services plane to identify a particular service engine 210 for the packet.

If a particular predicted flow is not identified (block 408—none), an ACL lookup may be conducted (block 412). For example, line interface 204-*x* may look for information in the packet header that indicates the packet falls under a particular rule (e.g., a services rule from ACL 308) that requires services for the packet. Line interface 204-*x* may obtain a service tag (or other indicator) for the packet based on a lookup in the ACL. If line interface 204-*x* determines that the service tag contains information that falls under an ACL rule (block 412—match), then the packet may be forwarded to the services plane for identification of a service engine based on the ACL rule (block 410). If line interface 204-*x* determines that the packet does not contain information that falls under an ACL rule (block 412—none), then the packet is forwarded for validating the egress interface, egress forwarding and configuration ACL lookups (block 414). Similarly, when the service processing of block 406 is complete, the packet may be forwarded for validating the egress interface, egress forwarding and configuration ACL lookups (block 414). For example, line interface 204-*x* may forward the packet via switch fabric 206 to another line interface that may apply outgoing access control lists (oACLs) and forward the packet to another destination within network 100. Validating the egress interface may include, for example, an egress line interface 204-*x* confirming that the packet is being sent over an interface consistent with the requested treatment of the packet (as described, for example, in the packet header). The service plane may identify the egress line interface(s) (e.g., line interface 204-*x*) that are to be used for each packet in the flow. If the line interface 204-*x* is not consistent with the requested treatment of the packet (e.g., the packet may be labeled for a private network line, but the selected line interface not in a zone that supports a private network, such as a public Internet zone), the packet may be dropped or forwarded back to the services plane.

While three look-up processes (i.e., flow table match (block 404), predicted flow match (block 408) and ACL match (block 412)) have been described as being performed in the forwarding plane of process 400, in other implementations, advantages of the methods and systems herein may be realized with fewer than three look-up processes in the forwarding plane. For example, in one implementation, only a predicted flow match and an ACL match may be performed in the forwarding plane. Also, additional processes not shown in FIG. 4 may also be conducted in the forwarding plane. For example, line interface 204-*x* may conduct a route lookup for a packet (using, e.g., forwarding table 306 of FIG. 3) to determine destination information for the packet. In one implementation, the line interface 204-*x* that receives a packet for egress forwarding and configuration (in block 414) may repeat the forwarding plane lookups that were performed by the ingress line interface (e.g., blocks 404, 408, and 412, shown in FIG. 4 with dotted line).

For a packet that does not receive services within network device 102, an ingress line interface (such as line interface 204-2 of FIG. 2B) and an egress line interface (such as line interface 204-4 of FIG. 2B) may perform look-ups in the forwarding plane. If a need for route-based services is detected at an egress line interface, then the packet may be forwarded to the services plane for identification and performance of particular services (block 410).

EXAMPLE

Figure 5A:
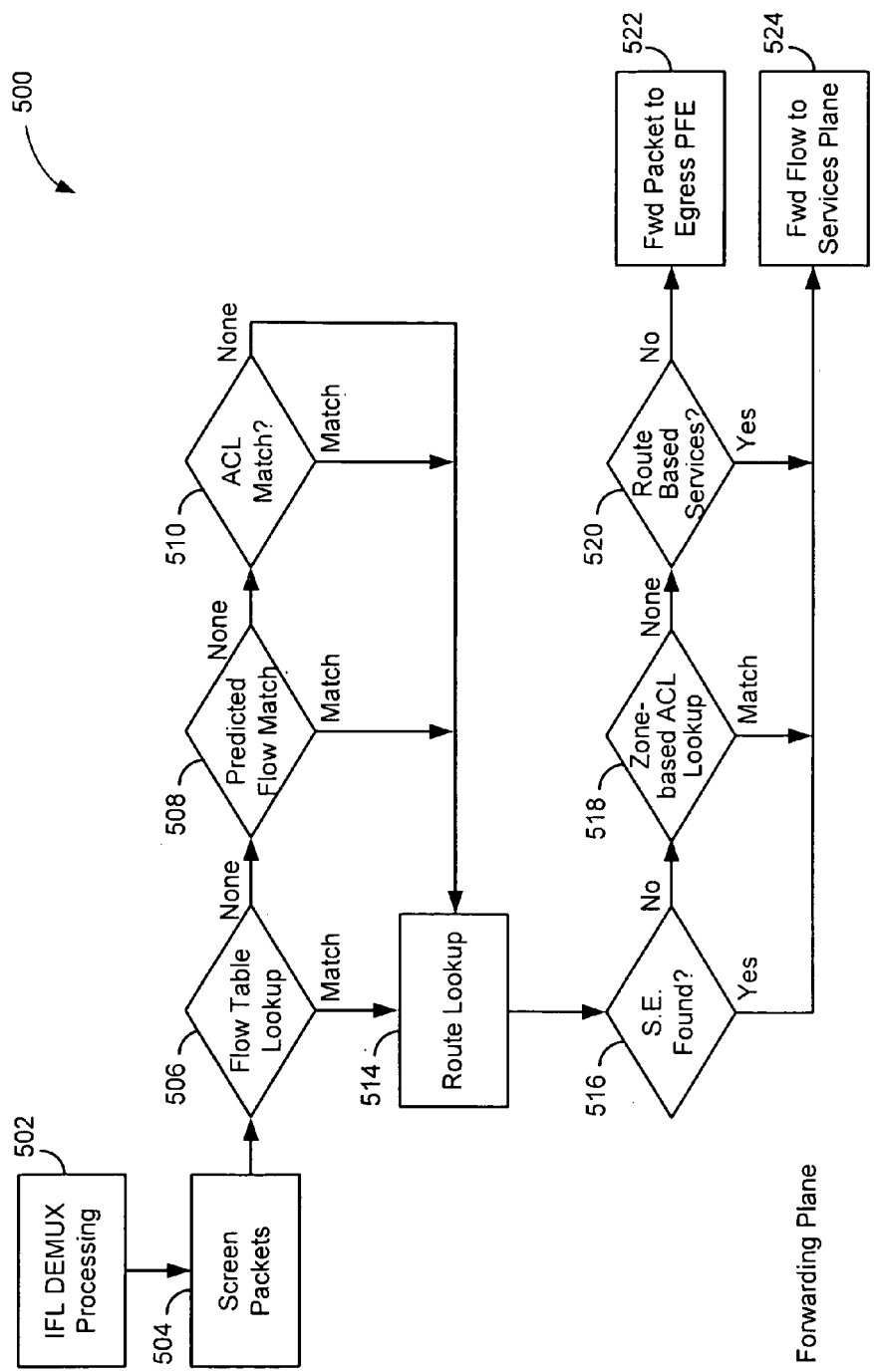
FIG. 5A is a flow diagram for ingress processing by a line interface in the forwarding plane.
Figure 5B:
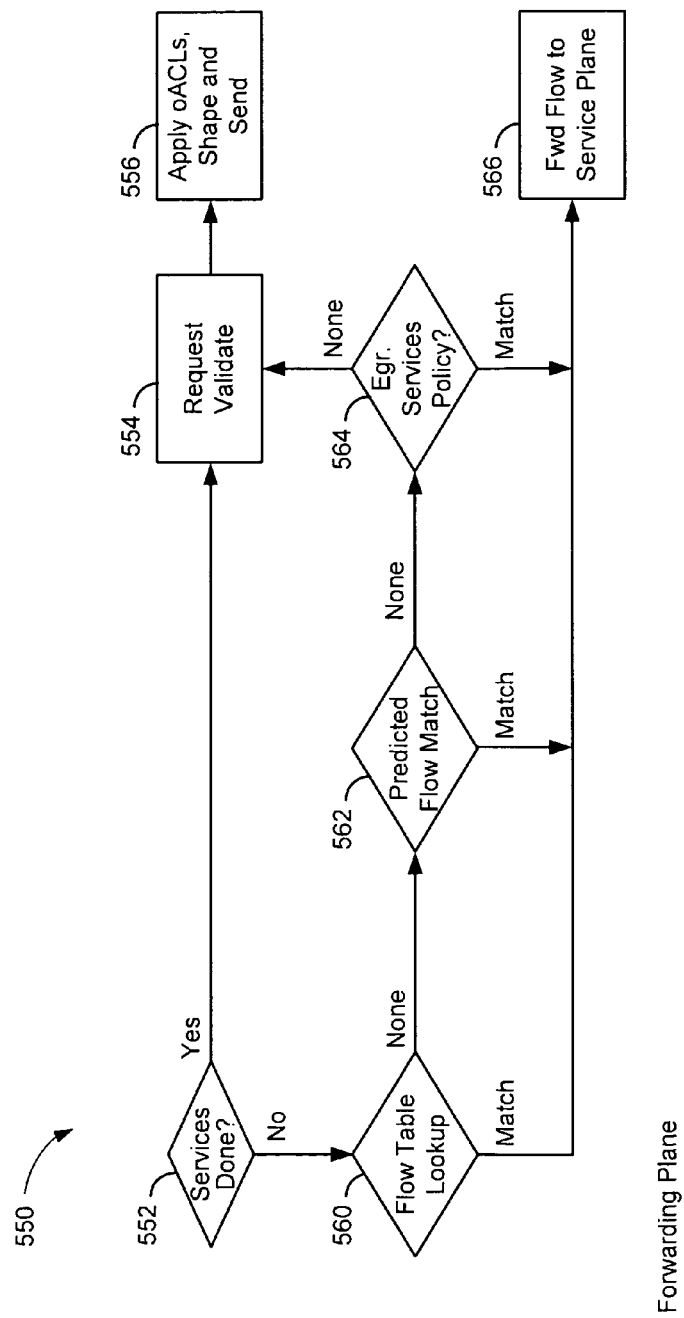
FIG. 5B is a flow diagram for egress processing by a line interface in the forwarding plane.

The following example illustrates a particular implementation of the process of FIG. 4. The example, with reference to FIGS. 5A and 5B, illustrates packet flow for separating forwarding and services in hardware (e.g., on an ASIC) in an integrated services router. FIG. 5A illustrates packet flow 500 for ingress processing by a line interface (such as a packet forwarding engine (PFE)) in the forwarding plane, and FIG. 5B illustrates packet flow 550 for egress processing by a line interface in the forwarding plane.

Referring to FIG. 5A, a data packet is received at an intra-facility link (IFL) demultiplexer (DEMUX) for processing (block 502). For example, the IFL DEMUX may separate incoming data packet streams into individual packets and identify the logical port from which each packet came.

Incoming packets may be screened (block 504). For example, a packet filter in the line interface may operate on the data in the forwarding plane to defend a network device from attack by an untrusted source. Screening by the packet filter may including inspecting fields in a Transmission Control Protocol/Internet Protocol (TCP/IP) header in the packet including, the protocol type, the source and destination Internet Protocol (IP) address, and the source and destination port numbers. Generally, the packet filtering may be a stateless detection of anomalies. Optionally, in another implementation, the packet filtering of block 504 may be conducted in the services plane.

A flow table lookup may be conducted (block 506). For example, the line interface may evaluate header information in the incoming packet to determine if the packet is associated with a particular flow. The header information may be compared to a table (such as flow table 310 of FIG. 3) that designates one or more service engines and information about specific processing that the packet may require for a particular flow. If a particular flow is matched in the table, a state variable may be set for the packet to indicate a particular service engine in the services plane. A route lookup may also be conducted (block 514). For example, the line interface may examine the packet header to identify the intended destination for the packet.

If there is no match from the flow table lookup of block 506, predicted flow matching may be conducted (block 508). For example, the line interface may check to see if a predicted flow for the packet is discernable. If the packet contains information indicative of a predicted flow, a state variable may be set for the packet to indicate services will be required for the packet. A route lookup may be conducted (block 514).

If there is no match from the predicted flow matching of block 508, service-defining access control lists (ACLs) may be applied (block 510). For example, the line interface may look for information in the packet header that indicates that the packet falls under a particular rule (e.g., an ACL) that requires services for the packet. If the packet contains information indicating services are needed, a state variable may be set for the packet to indicate an appropriate service engine in the services plane. A route lookup may also be conducted (block 514).

If no stateful services are identified in blocks 506, 508 and 510, no state variable will be assigned to the packet and the packet may still be forwarded for a route lookup (block 514).

After the route lookup of block 514 is completed, the line interface may evaluate any state variables (or other metadata) applied to the packet to determine if a particular service engine can be identified for the indicated state (block 516). For example, the line interface may look for an appropriate service engine (such as one of service engine(s) 210 of FIGS. 2A-2E) based on the state variable that was identified in the flow table lookup of block 506 or the ingress services policy match of block 512. If a state variable indicates a particular service engine, the packet may be forwarded to that service engine in the services plane (block 524).

If no particular service engine is identified in block 516, then a zone-based ACL lookup may be conducted (block 518). For example, in contrast with the ingress services policy lookup of block 512, the line interface may apply policy routing tests based on both the ingress and destination information of the packet to identify whether services may be required. If the zone-based ACL lookup indicates services are needed, a state variable may be set for the packet to indicate an appropriate service engine in the services plane. The packet may be forwarded to the appropriate service engine in the services plane (block 524).

If the zone-based ACL lookup identifies no matches, then a lookup for route-based services may be conducted (block 520). If no route-based services are needed, then the packet may be forwarded to an egress packet forwarding engine (block 522). If a need for route-based services is identified, then a state variable may be set for the packet to indicate an appropriate service engine may need to be identified in the services plane. The packet may then be forwarded to the appropriate service engine (if known) or service engine distributor (if no service engine has been identified) in the services plane (block 524).

Referring now to FIG. 5B, packet flow 550 is shown for egress processing in the forwarding plane. A check may be conducted to see if services have been done to the incoming packet (block 552). For example, an egress line interface may look to see if services have been done previously within the network device. If services have been done, the requested egress line interface may be validated (block 554). For example, the line interface may confirm that its network connection is consistent with the requested treatment of the packet. If the egress interface is not consistent with the requested treatment for the packet, the packet may be dropped or forwarded back to the services plane.

If the egress request is validated, then output access control lists (oACLs) may be applied to the packet, traffic shaping may be applied, and the packet may be sent to the next routing destination in the network (block 556). For example, the egress line interface may apply oACLs that screen certain types of packets from being forwarded. After the packet has been screened against the oACLs, in one implementation, the egress line interface may compare the message arrival rate to the message transmission rate for the class of messages associated with the packet and place the packet within a shaping queue prior to eventually sending the packet.

If it is determined in block 552 that services have not been done, then a flow table lookup may be conducted (block 560) similar to that described in block 508 above. If a particular flow is matched, indicating services are needed, then a state variable may be set for the packet to indicate an appropriate service engine in the services plane. The packet may then be forwarded to the services plane (block 566). For example, in one implementation the packet may be forwarded to a service engine distributor (such as service engine distributor 208 of FIG. 2) or service engine(s) 210 within the services plane.

If there is no match from the flow table lookup in block 560, predicted flow matching may be conducted (block 562). For example, the line interface may check to see if a predicted flow for the packet is discernable. If the packet contains information indicative of a predicted flow, a state variable may be set for the packet to indicate a service engine will need to be identified in the services plane. The packet may then be forwarded to the services plane (block 566), as described above.

If there is no match from the predicted flow matching in block 562, egress service policies may be applied (block 564). For example, the line interface may look for information in the packet header that indicates the packet falls under a particular rule or ACL that requires services for the packet. If the packet contains information indicating services are needed, a state variable may be set for the packet to indicate an appropriate service engine in the services plane. The packet may then be forwarded to the services plane (block 566), as described above. If no egress services policies are applicable, then the requested egress line interface may be validated (block 554), the object access control lists (oACLs) may be applied to the packet, and packet may eventually be sent to the next destination (block 556).

CONCLUSION

Implementations described herein provide for systems and methods that provide architectural separation of forwarding and services functions in an integrated services router. The forwarding plane may restrict itself to forwarding functions, including route lookup; while the services plane may restrict itself to stateful services. A packet may traverse the forwarding and services planes as often as required to provide necessary processing of the packet. The forwarding plane may provide to the service plane results from forwarding functions undertaken in the forwarding plane.

The foregoing description of exemplary implementations provides illustration and description, but is not intended to be exhaustive or to limit the invention to the precise form disclosed. Modifications and variations are possible in light of the above teachings or may be acquired from practice of the invention.

For example, line interface 102-x may be implemented in hardware, firmware, or some combination of hardware and software. For example, various portions of line interface 102-x may be implemented in application-specific integrated circuits (ASICs). The ASICs may be configured to perform some processing via dedicated logic, and may also be configured to perform some processing using microcode instructions that may be stored in memory. In other implementations, line interface 102-x may be practiced using a variety of hardware configurations in addition to, or instead of, ASICs. For example, some combination of general purpose processors, digital signal processors (DSPs), and/or programmable gate arrays (PGAs) may also be utilized to implement the functionality described herein.

In addition, while series of blocks have been described with respect to FIGS. 4, 5A and 5B, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include firmware, hardware, such as a processor, a microprocessor, an application-specific integrated circuit (ASIC), or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving a packet at an egress line interface of a forwarding plane of a network element;
determining that a service has not been performed on the packet in a services plane of the network element;
determining whether an existing flow can be identified for the packet by conducting a flow table lookup at the egress line interface;
determining, when the existing flow cannot be identified for the packet, whether a predicted flow can be identified for the packet at the egress line interface;
performing, when the predicted flow cannot be identified for the packet, a service access control list (ACL) lookup at the egress line interface; and
forwarding, after determining that the service has not been performed on the packet, the packet to the services plane based on the existing flow, the predicted flow, or the service ACL lookup.

2. The method of claim 1, where forwarding the packet to the services plane comprises:
identifying a particular service engine, of a plurality of service engines, by forwarding the packet to a service engine distributor; and
forwarding the packet from the service engine distributor to the particular service engine.

3. The method of claim 1, where forwarding the packet to the services plane comprises:
determining that the existing flow, the predicted flow, or the service ACL lookup indicates a need for service processing; and
forwarding the packet to the services plane after determining that the existing flow, the predicted flow, or the service ACL lookup indicates the need for service processing.

4. The method of claim 1, where forwarding the packet to the services plane comprises:
   identifying a particular service engine of a plurality of service engines; and
   forwarding the packet the particular service engine.

5. The method of claim 1, further comprising:
   determining, at an ingress line interface of the forwarding plane, that service processing is not needed for the packet; and
   forwarding the packet from the ingress line interface to the egress line interface after determining, at the ingress line interface, that the service processing is not needed for the packet.

6. The method of claim 1, further comprising:
   receiving the packet at an ingress line interface of the forwarding plane;
   determining whether the existing flow can be identified for the packet, at the ingress line interface, by conducting an initial flow table lookup at the ingress line interface;
   determining, when the existing flow cannot be identified at the ingress line interface, whether the predicted flow can be identified for the packet at the ingress line interface; and
   performing, when the predicted flow cannot be identified at the ingress line interface, an initial service ACL lookup; and
   forwarding the packet to one of the services plane or the egress line interface based on the existing flow, the predicted flow, or the initial service ACL lookup.

7. The method of claim 6, where performing the initial service ACL lookup comprises:
   determining that a lookup of ingress services policies does not identify a need for service processing; and
   applying a zone-based access control list (ACL) to the packet after determining that the lookup of ingress services policies does not identify the need for service processing.

8. The method of claim 1, further comprising:
   conducting a lookup for route-based services in the forwarding plane, and
   forwarding the packet based on the lookup for route-based services.

9. A network device comprising:
   a line interface, the line interface being in a forwarding plane and including:
      a processor to:
         receive a packet at the line interface,
         determine whether an existing flow can be identified for the packet by conducting a flow table lookup for the packet,
         determine whether a predicted flow can be identified for the packet when the existing flow cannot be identified for the packet,
         conduct an access control list (ACL) lookup when the predicted flow cannot be identified for the packet,
         determine whether the flow table lookup, the predicted flow, or the ACL lookup indicates a need for service processing for the packet, and
         forward the packet to an egress line interface of the forwarding plane when the flow table lookup, the predicted flow, or the ACL lookup does not indicate the need for service processing for the packet,
         the egress line interface determining whether the predicted flow or another predicted flow can be determined for the packet.

10. The network device of claim 9, where the network device comprises:
    a router,
    a switch,
    a firewall device, or
    a server device.

11. The network device of claim 9, further comprising:
    a service engine distributor to:
       receive the packet,
       identify a particular service engine based on the flow table lookup, the predicted flow, or the ACL lookup, and
       forward the packet to the particular service engine.

12. The network device of claim 9, where the egress line interface further comprises:
    an existing flow table that stores information for existing packet flows,
       the existing packet flows including the existing flow when the existing flow can be identified for the packet.

13. The network device of claim 9, where the processor is further to:
    forward the packet to a services plane when the flow table lookup, the predicted flow, or the ACL lookup indicates the need for service processing; and
    provide information regarding the forwarding of the packet to the services plane.

14. The network device of claim 9, where the processor is included in an application-specific integrated circuit (ASIC).

15. A network element comprising:
    one or more processors to:
       receive a packet at an egress line interface of a forwarding plane;
       determine that a service has not been performed on the packet in a services plane;
       determine whether an existing flow can be identified for the packet;
       determine whether a predicted flow can be determined for the packet when the existing flow cannot be identified for the packet;
       conduct an egress services policy lookup for the packet when the predicted flow cannot be determined for the packet; and
       forward, after determining that the service has not been performed on the packet, the packet to a services plane based on the existing flow, the predicted flow, or the egress services policy lookup.

16. A method comprising:
    receiving, by a network device, a packet at an egress line interface in the forwarding plane of the network device;
    determining, by the network device, that a service has not been performed on the packet in a services plane of the network device;
    determining, by the network device, whether an existing flow can be identified for the packet by conducting a flow table lookup;
    determining, by the network device and when the existing flow cannot be identified for the packet, whether a predicted flow can be determined for the packet;
    conducting, by the network device, an egress services policy lookup when the predicted flow cannot be determined for the packet; and
    forwarding, by the network device and after determining that the service has not been performed on the packet, the packet to a service engine distributor based on the flow table lookup, the predicted flow, or the egress services policy lookup.

17. The method of claim 16, where the service engine distributor is located in the services plane of the network device.

18. The method of claim 17, further comprising:
confirming that the packet is being sent over an interface described in a header of the packet.

19. A network device comprising:
a services plane; and
a forwarding plane comprising:
   an egress line interface to:
      receive a packet from an ingress line interface,
      determine that a service has not been performed on the packet in the services plane,
      determine whether an existing flow can be identified for the packet by conducting a flow table lookup,
      determine whether a predicted flow can be identified for the packet when the existing flow cannot be identified,
      perform a service access control list (ACL) lookup when the predicted flow cannot be identified, and
      forward, after determining that the service has not been performed, the packet to the services plane based on the existing flow, the predicted flow, or the service ACL lookup.

20. The network device of claim 19, where the services plane comprises:
a plurality of service engines to perform services; and
a service engine distributor to:
   receive the packet,
   identify a particular service engine of the plurality of service engines, and
   forward the packet to the particular service engine.

\* \* \* \* \*